3,711,460
REACTIVE DISAZO DYESTUFFS CONTAINING
FIBER-REACTIVE PYRIMIDINE GROUPS
Karl-Heinz Schündehütte, Opladen, Germany, assignor to Farbenfabriken Bayer Aktiengesellschaft, Leverkusen, Germany
No Drawing. Filed Nov. 30, 1967, Ser. No. 686,815
Claims priority, application Germany, Dec. 5, 1966, F 50,851
Int. Cl. C09b 62/16, 62/24, 62/40
U.S. Cl. 260—154
7 Claims

ABSTRACT OF THE DISCLOSURE

Reactive disazo dyestuffs of the formula

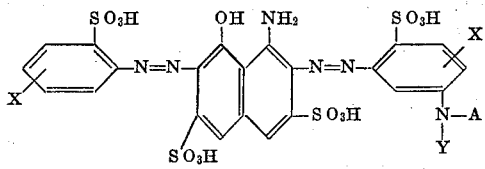

wherein X is hydrogen, sulfonic acid, halo, nitro, lower alkyl or lower alkoxy; R is hydrogen, alkyl or aryl; Y is hydrogen or —$CH_3$; and A is a reactive heterocyclic ring (especially a reactive pyrimidine ring) which dyestuffs are useful in dyeing cellulose to give dyeings with good light and wet fastness and in dyeing wool, silk and polyamide fibers.

---

The present invention relates to valuable new reactive dye-stuffs of the general formula

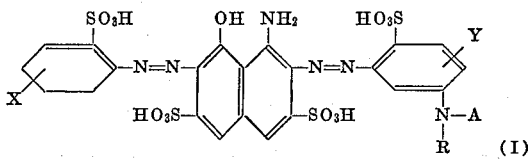

In this formula X stands for hydrogen, a sulphonic acid group or a halogen, nitro, lower alkyl or lower alkoxy substituent, Y for hydrogen or —$CH_3$, R for hydrogen or an alkyl or aryl radical and A for a cyclic reactive group which is bound to the N(R) group either by a direct linkage or through a bridge member -(alkylene)$_p$SO$_2$—, -(arylene)$_p$SO$_2$—, -(alkylene)$_p$CO— or -(ararylene)$_p$CO— wherein p stands for the number 0 or 1. As halogen substituent X in particular Cl and Br are suitable, and as alkyl or alkoxy substituent X those with 1 to 3 carbon atoms are eligible. R is preferably hydrogen or a lower alkyl radical containing 1 to 3 carbon atoms.

The reactive groups A mentioned above are cyclic groupings which have one or more reactive groups, or substitutents which are capable of being split off, which, when the dyestuffs are applied to cellulose materials in the presence of acid-binding agents and possibly under the action of temperature, are capable of reacting with the hydroxyl groups of the cellulose with the formation of covalent bonds. A large number of such reactive groups is known from the literature. The groupings stated hereinafter therefore represent only a selection of the possible reactive groups A in the new dyestuffs. Suitable reactive groups are, among others, those which contain at least one reactive substituent attached to a 5- or 6-membered heterocyclic ring, as to a monoazine, diazine, triazine, e.g. pyridine, pyrimidine, pyridazine, pyrazine, thiazine, oxazine, or asymmetrical or symmetrical triazine ring, or to a ring system which has one or more condensed-on aromatic rings, such as quinoline, phthalazine, cinnoline, quinazoline, quinoxaline, acridine, phenazine and phenanthridine ring system; the 5- or 6-membered heterocyclic rings which have at least one reactive substituent are, accordingly, preferably those which contain one or more nitrogen atoms and may contain 5- or preferably 6-membered carbocyclic rings condensed on. Among the reactive substituents on the heterocycle there are to be mentioned, for example, halogen (Cl, Br or F), ammonium, including hydrazinium, sulphonium, sulphonyl, azido-($N_3$), thiocyanato, thio, thioether, hydroxy ether, sulphinic acid and sulphonic acid. To be named individually are, for example (including the possible bridge members to the N(R) groups):

mono- or dihalogen-sym.-triazinyl radicals, e.g.,
2,4-dichlorotriazinyl-6-,
2-amino-4-chlortriazinyl-6-,
2-alkylamino-4-chlorotriazinyl-6-, such as
2-methylamino-4-chlorotriazinyl-6-,
2-ethyl- or 2-propylamino-4-chlorotriazinyl-6-,
2-β-hydroxyethylamino-4-chlortriazinyl-6-,
2-di-β-hydroxyethylamino-4-chlortriazinyl-6-
and the corresponding sulphuric acid half-esters,
2-diethylamino-4-chlortriazinyl-6-, 2-morpholino- or
2-piperidino-4-chlortriazinyl-6-,
2-cyclohexylamino-4-chlortriazinyl-6-,
2-arylamino- and subst. arylamino-4-chlortriazinyl-6-, such as
2-phenylamino-4-chlortriazinyl-6-,
2-(o-, m- or p-sulphophenyl)-amino-4-chlortriazinyl-6-,
2-alkoxy-4-chlortriazinyl-6-, such as
2-methoxy- or -ethoxy-4-chlortriazinyl-6-,
2-(phenylsulphonylmethoxy)-4-chlortriazinyl-6-,
2-aryloxy- and subst. aryloxy-4-chlortriazinyl-6-, such as
2-phenoxy-4-chlortriazinyl-6-,
2-(p-sulphophenyl)-hydroxy-4-chlortriazinyl-6-,
2-(o-, m- or p-methyl- or methoxyphenyl)-hydroxy-4-chlortriazinyl-6-,
2-alkylmercapto- or 2-arylmercapto- or 2-(subst. aryl)-mercapto-4-chlortriazinyl-6-, such as
2-(β-hydroxyethyl)-mercapto-4-chlortriazinyl-6-,
2-phenylmercapto-4-chlortriazinyl-6-,
2-(4'-methylphenyl)-mercapto-4-chlortriazinyl-6-,
2-(2',4'-dinitro)-phenylmercapto-4-chlortriazinyl-6-,
mono-, di- or trihalogenpyrimidyl radicals, such as
2,4-dichlorpyrimidyl-6-,
2,4,5-trichlorpyrimidyl-6-,
2,4-dichlor-5-nitro- or -5-methyl- or -5-carboxymethyl- or -5-carboxy- or -5-cyano- or -5-vinyl- or -5-sulpho or -5-mono-, -di- or -trichlormethyl- or -5-carboalkoxypyrimidyl-6-,
2,6-dichlorpyrimidine-4-carbonyl-,
2,4-dichloropyrimidine-5-carbonyl-,
2-chlor-4-methylpyrimidine-5-carbonyl-,
2-methyl-4-chlorpyrimidine-5-carbonyl-,
2-methylthio-4-fluoropyrimidine-5-carbonyl-,
6-methyl-2,4-dichloropyrimidine-5-carbonyl-,
2,4,6-trichlorpyrimidine-5-carbonyl-,
2,4-dichlorpyrimidine-5-sulphonyl- or -5-carbonyl-,
2-chlorquinoxaline-3-carbonyl, 2- or 3-monochlorquinoxaline-6-carbonyl-, 2- or 3-monochlorquinoxaline-6-sulphonyl-,
2,3-dichlorquinoxaline-6-carbonyl-,
2,3-dichlorquinoxaline-6-sulphonyl-,
1,4-dichlorphthalazine-6-sulphonyl-
or -6-carbonyl-, 2,4-dichlorquinazoline-7-
or -6-sulphonyl- or -carbonyl-, 2- or 3- or 4-(4',5'-dichlorpyridazone-6'-yl-1')-phenylsulphonyl- or
-carbonyl-, β-(4',5'-dichlorpyridazone-6'-yl-1')-ethyl-carbonyl-, as well as the corresponding bromine and fluorine derivatives of the above-mentioned chlorine substituted heterocyclic radicals; sulphonyl-group containing triazine radicals, such as 2,4-bis-(phenylsulphonyl)-triazinyl-6-,
2-(3'-carboxyphenyl)-sulphonyl-4-chlortriazinyl-6-,
2-(3'-sulphophenyl)-sulphonyl-4-chlortriazinyl-6-,
2,4-bis-(3'-carboxyphenylsulphonyl-1')-triazinyl-6-;

sulphonyl-group-containing pyrimidine rings, such as 2-carboxymethylsulphonyl-pyrimidinyl-4,
2-methylsulphonyl-6-methyl-pyrimidinyl-4,
2-methylsulphonyl-6-ethyl-pyrimidinyl-4,
2-phenylsulphonyl-5-chlor-6-methyl-pyrimidinyl-4,
2,6-bis-methylsulphonyl-pyrimidinyl-4,
2,6-bis-methylsulphonyl-5-chlor-pyrimidinyl-4,
2,4-bis-methylsulphonyl-pyrimidine-5-sulphonyl,
2-methylsulphonyl-pyrimidinyl-4,
2-phenylsulphonylpyrimidinyl-4,
2-trichlormethylsulphonyl-6-methyl-pyrimidinyl-4,
2-methylsulphonyl-5-chlor-6-methyl-pyrimidinyl-4,
2-methylsulphonyl-5-bromo-6-methyl-pyrimidinyl-4,
2-methylsulphonyl-5-chlor-6-ethyl-pyrimidinyl-4,
2-methylsulphonyl-5-chlor-6-chlor-methyl-pyrimidinyl-4,
2-methylsulphonyl-4-chlor-6-methylpyrimidine-5-sulphonyl,
2-methylsulphonyl-5-nitro-6-methyl-pyrimidinyl-4,
2,5,6-tris-methylsulphonyl-pyrimidinyl-4,
2-methylsulphonyl-5,6-dimethyl-pyrimidinyl-4,
2-ethylsulphonyl-5-chlor-6-methyl-pyrimidinyl-4,
2-methylsulphonyl-6-chlor-pyrimidinyl-4,
2,6-bis-methylsulphonyl-5-chlorpyrimidinyl-4,
2-methylsulphonyl-6-carboxy-pyrimidinyl-4,
2-methylsulphonyl-5-sulpho-pyrimidinyl-4,
2-methylsulphonyl-6-carbomethoxy-pyrimidinyl-4,
2-methylsulphonyl-5-carboxy-pyrimidinyl-4,
2-methylsulphonyl-5-cyano-6-methoxy-pyrimidinyl-4,
2-methylsulphonyl-5-chlor-pyrimidinyl-4,
2-sulphoethylsulphonyl-6-methyl-pyrimidinyl-4,
2-methylsulphonyl-5-bromo-pyrimidinyl-4,
2-phenylsulphonyl-5-chlor-pyrimidinyl-4,
2-carboxymethylsulphonyl-5-chlor-6-methyl-pyrimidinyl-4,
2-methylsulphonyl-6-chlorpyrimidine-4-
and -5-carbonyl-, 2,6-bis-(methylsulphonyl)-pyrimidine-4-,
or -5-carbonyl-, 2-ethylsulphonyl-6-chlorpyrimidine-5-carbonyl-,
2,4-bis-(methylsulphonyl)-pyrimidine-5-sulphonyl-,
2-methylsulphonyl-4-chlor-6-methylpyrimidine-5-sulphonyl- or -carbonyl-;

ammonium-group-containing triazine rings, such as 2-trimethylammonium-4-phenylamino-
or -4-(o-, m- or p-sulphophenyl)-aminotriazinyl-6-,
2-(1,1-dimethyl-hydrazinium)-4-phenylamino-
or -4-(o-, m- or p-sulphophenyl)-aminotriazinyl-6-,
2-(2-isopropylidene-1,1-dimethyl)-hydrazinium-4-phenylamino- or
-4-(o-, m -or p-sulphophenyl)-aminotriazinyl-6-,
2-N-aminopyrrolidinium- or
2-N-aminopiperidinium-4-phenylamino- or
-4-(o-, m- or p-sulphophenyl)-aminotriazinyl-6-,
further 4-phenylamino- or 4-(sulphophenylamino)-triazinyl-6- radicals which contain, attached in quaternary manner in 2-position via a nitrogen bond, 1,4-bis-aza-bicyclo [2,2,2]-octane;
2-pyridinium-4-phenylamino- or
-4-(0-, m- or p-sulphophenyl)-amino-triazinyl-6- as well as corresponding 2-oniumtriazinyl-6 radicals which are substituted in 4-position by alkylamino, such as methylamino, ethylamino or β-hydroxyethylamino, or alkoxy, such as in methoxy or alkoxy, or aroxy, such as phenoxy or sulphophenoxy groups;

2-chlorbenzthiazole-5-
or -6-carbonyl-
or -5- or -6-sulphonyl-,
2-arylsulphonyl-
or -alkylsulphonyl-benzthiazole-5-
or -6-carbonyl-
or -5- or -6-sulphonyl-,
such as 2-methylsulphonyl-
or 2-ethylsulphonyl-benzthiazole-5-or -6-sulphonyl- or carbonyl-,
2-phenylsulphonyl-benzthiazole-5- or -6-sulphonyl- or -carbonyland the corresponding derivatives which contain sulpho groups in the condensed-on benzene ring, 2-chlorbenzoxazole-5- or -6-carbonyl- or -sulphonyl-,
2-chlorbenzimidazole-5- or -6-carbonyl- or -sulphonyl-,
2-chloro-1-methylbenzimidazole-5- or -6-carbonyl- or -sulphonyl-,
2-chlor-4-methylthiazole-(1,3)-5-carbonyl- or
-4- or -5-sulphonyl-, N-oxide of 4-chlor-
or 4-nitroquinoline-5-carbonyl.

A group of dyestuffs of the present invention can be represented by the formula

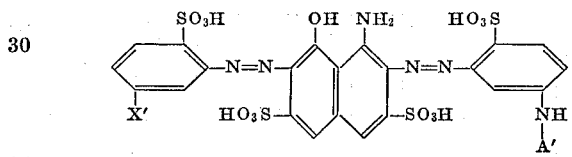

where X' is hydrogen or sulfonic acid; A' is

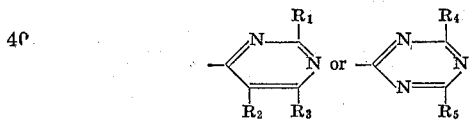

wherein $R_1$ is lower alkyl sulfonyl, phenyl sulfonyl, fluorine, chlorine or bromine; $R_2$ is hydrogen, chlorine, bromine, carboxy, methyl, carbomethoxy, lower alkyl sulfonyl or cyano; $R_3$ is methyl, chlorine, bromine, lower alkyl sulfonyl, phenyl sulfonyl, carboxy, carbomethoxy or methoxy; $R_4$ is chlorine, bromine or fluorine; and $R_5$ is chlorine, bromine, amino, methylamino, ethylamino, dimethylamino, diethylamino, propylamino, β-hydroxyethylamino, di-(β-hydroxyethyl)-amino, morpholino, piperidino, phenylamino, 2'-sulfo- or 3'-sulfo- or 4'-sulfophenylamino, 2'4'-disulfo or 2',5'-disulfo-phenylamino, chloro phenylamino, toluylamino, α-naphthylamino, β-naphthylamino, sulfo- α-naphthylamino or sulfo-β-naphthylamino.

Representative compounds of the above formula are

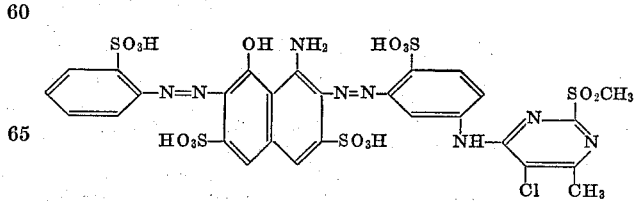

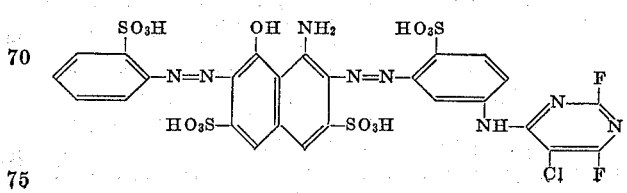

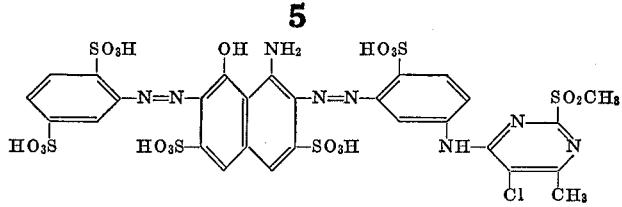

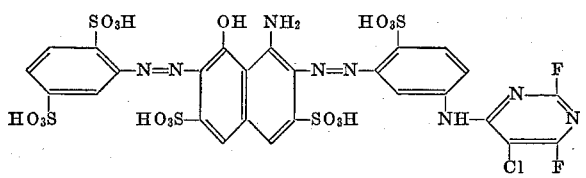

Particularly preferred dyestuffs in the range of the new dyestuffs (I) are those in which the reactive group A is a 6-membered diazine or triazine ring in which a carbon atom is combined with the group N–R and which has at least one sulphonyl (such as alkylsulphonyl, aralkylsulphonyl, arylsulphonyl or heterosulphonyl) substituent capable of being split off. Among these, there are of quite outstanding interest pyrimidine rings which have at least one lower alkylsulphonyl or arylsulphonyl radical which may be further substituted, such as 2-methylsulphonyl-5-chlor-6-methylpyrimidine-yl-4,
2-ethylsulphonyl-5-chlor-6-methylpyrimidine-yl-4,
2-phenylsulphonyl-5-chlor-6-methylpyrimidine-yl-4 and some pyrimidine rings already stated which contain in the 2-position a sulphonyl substituent capable of being split off and, in 5- and/or 6-position, substituents such as halogen, low alkyl and the like.

The new dyestuffs are obtained by first combining unilaterally 1 mole 1-amino-8-hydroxynaphthalene-3,6-disulphonic acid in acid medium with approximately 1 mole of the diazo compound of an amine of the formula

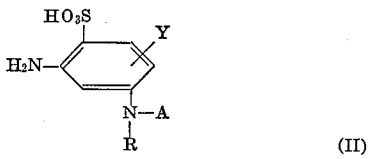

(II)

wherein Y stands for hydrogen or a methyl group, R for hydrogen, an alkyl or aryl radical, and A has the above indicated meaning, and then in alkaline medium with approximately 1 mole of the diazo compound of an amine of the formula

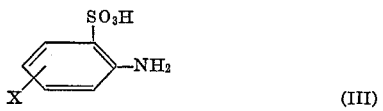

(III)

wherein X stands for hydrogen, a sulphonic acid group or a halogen, nitro, lower alkyl or lower alkoxy substituent.

According to a modification of this proces, the dyestuffs can also be prepared in such a manner that aminodisazo dyestuffs of the formula

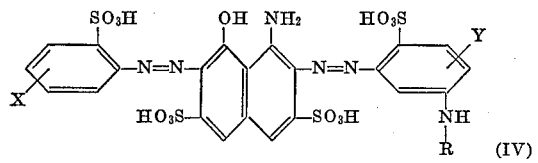

(IV)

wherein X, Y and R have the meaning stated are condensed at the grouping

with compounds A–W wherein A has the meaning already stated and W stands for a substituent capable of being split off, and W is connected with A either by a direct linkage or through a grouping $-(\text{alkylene})_p SO_2-$, $-(\text{arylene})_p SO_2-$, $-(\text{alkylene})_p CO-$ or $-(\text{arylene})_p CO-$ wherein p is the number 0 or 1, with the formation of the grouping

The reaction of the starting components for the preparation of the new dyestuffs according to the first method takes place in aqueous or aqueous-organic medium. The disazo compounds of Formula IV used as starting dyestuffs are prepared in a manner which is the same in principle, i.e. first by acid coupling of, e.g., the diazo component of the formula

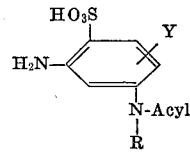

(V)

wherein R and Y have the meaning stated and acyl stands for the radical of an aromatic or aliphatic carboxylic acid followed by alkaline coupling of the diazo component (III) in aqueous or aqueous-organic medium and then hydrolytic splitting off of the acyl radical.

The condensation of the amino group —NHR with compounds A–W is, in general, an acylation reaction which is carried out in aqueous, aqueous-organic or organic medium. The reaction conditions for the introduction of the radical A into the diazo component (II) or into the aminodisazo dyestuff (IV) are in principle the same.

Suitable reactive components A–W are for example those on which the aforementioned reactive groups A are based, i.e. in general the halides or sulphonyl compounds of the said acyl components. From the large number of compounds available, there are extracted for mention here, including the possible bridge members between A and W:

Trihalogen-sym.-triazines, such as cyanuric chloride and cyanuric bromide, dihalogen-monoamino- and -mono-subst.-amino-sym.-triazines, such as 2,6-dichlor-4-aminotriazine,
2,6-dichlor-4-methylaminotriazine,
2,6-dichlor-4-ethylaminotriazine,
2,6-dichlor-4-hydroxyethylaminotriazine,
2,6-dichlor-4-phenylaminotriazine,
2,6-dichlor-4-(o-, m- or p-sulphophenyl)-aminotriazine,
2,6-dichlor-4-(2',3'-, -2',4'-, -3',4'- or -3',5'-disulphophenyl)-aminotriazine, dihalogen-alkoxy- and -aryloxy-sym.-triazines, such as
2,6-dichlor-4-methoxytriazine,
2,6-dichlor-4-ethoxytriazine,
2,6-dichlor-4-phenoxytriazine,
2,6-dichloro-4-(o, m- or p-sulphophenyl)-hydroxytriazine,
dihalogen-alkylmercapto- and -arylmercapto-sym.-triazines, such as
2,6-dichlor-4-ethylmercapto-triazine,
2,6-dichlor-4-phenylmercaptotriazine,
2,6-dichlor-4-(p-methylphenyl)-mercaptotriazine,
tetrahalogenpyrimidines, such as tetrachlor-, tetrabromo- or tetrafluoro-pyrimidine,
2,4,6-trihalogen-pyrimidines, such as
2,4,6-trichlor-, -tribromo- or -trifluoro-pyrimidine,
dihalogenpyrimidines, such as
2,4-dichlor-, -dibromo- or -difluoropyrimidine,
2,4,6-trichlor-5-nitro- or -5-methyl- or -5-carbomethoxy-
   or -5-carboethoxy- or -5-carboxymethyl- or -5-mono
   -di- or -trichloromethyl- or -5-carboxy- or -5-sulpho-
   or -5-cyano- or -5-vinylpyrimidine,
2,4-dichloropyrimidine-5-carboxylic acid chloride,
2,4,6-trichloropyrimidine-5-carboxylic acid chloride,
2-methyl-4-chlorpyrimidine-5-carboxylic acid chloride,
2-chlor-4-methylpyrimidine-5-carboxylic acid chloride,
2,6-dichlorpyrimidine-4-carboxylic acid chloride;

pyrimidine reactive components with sulphonyl groups capable of being split off, such as 2-carboxymethylsulphonyl-4-chloropyrimidine,
2-methylsulphonyl-4-chlor-6-methylpyrimidine,
2,4-bis-methylsulphonyl-6-methylpyrimidine,
2,4-bis-phenylsulphonyl-5-chlor-6-methylpyrimidine,
2,4,6-tris-methylsulphonylpyrimidine,
2,6-bis-methylsulphonyl-4,5-dichlorpyrimidine,
2,4-bis-methylsulphonylpyrimidine-5-sulphonic acid chloride,
2-methylsulphonyl-4-chlorpyrimidine,
2-phenylsulphonyl-4-chlorpyrimidine,
2,4-bis-trichlormethylsulphonyl-6-methylpyrimidine,
2,4-bis-methylsulphonyl-5-chlor-6-methylpyrimidine,
2,4-bis-methylsulphonyl-5-brom-6-methylpyrimidine,
2-methylsulphonyl-4,5-dichlor-6-methylpyrimidine,
2-methylsulphonyl-4,5-dichlor-6-chlormethylpyrimidine,
2-methylsulphonyl-4-chlor-6-methylpyrimidine-5-sulphonic acid chloride,
2-methylsulphonyl-4-chlor-5-nitro-6-methylpyrimidine,
2,4,5,6-tetramethylsulphonylpyrimidine,
2-methylsulphonyl-4-chlor-5,6-dimethylpyrimidine,
2-ethylsulphonyl-4,5-dichlor-6-methylpyrimidine,
2-methylsulphonyl-4,6-dichlorpyrimidine,
2,4,6-tris-methylsulphonyl-5-chlorpyrimidine,
2-methylsulphonyl-4-chlor-6-carboxypyrimidine,
2-methylsulphonyl-4-chlorpyrimidine-5-sulphonic acid,
2-methylsulphonyl-4-chlor-6-carbomethoxypyrimidine,
2-methylsulphonyl-4-chlorpyrimidine-5-carboxylic acid,
2-methylsulphonyl-4-chlor-5-cyano-6-methoxypyrimidine,
2-methylsulphonyl-4,5-dichlorpyrimidine,
4,6-bis-methylsulphonylpyrimidine,
4-methylsulphonyl-6-chlorpyrimidine,
2-sulphoethylsulphonyl-4-chlor-6-methylpyrimidine,
2-methylsulphonyl-4-chlor-5-bromopyrimidine,
2-methylsulphonyl-4-chlor-5-bromo-6-methylpyrimidine,
2,4-bis-methylsulphonyl-5-chlorpyrimidine,
2-phenylsulphonyl-4,5-dichlorpyrimidine,
2-phenylsulphonyl-4,5-dichlor-6-methylpyrimidine,
2-carboxymethylsulphonyl-4,5-dichlor-6-methyl-pyrimidine,
2-methylsulphonyl-6-chlorpyrimidine-4- or -5-carboxylic acid chloride,
2-ethylsulphonyl-6-chlorpyrimidine-4- or -5-carboxylic acid chloride,
2,6-bis-(methylsulphonyl)-pyrimidine-4-carboxylic acid chloride,
2-methylsulphonyl-6-methyl-4-chloro or -4-bromopyrimidine-5-carboxylic acid chloride or -bromide,
2,6-bis-(methylsulphonyl)-4-chlorpyrimidine-5-carboxylic acid chloride;

further reactive components of the heterocyclic series with reactive sulphonyl substituents are for example 3,6-bis-phenylsulphonylpyridazine,
3-methylsulphonyl-6-chlorpyridazine,
3,6-bis-trichloromethylsulphonylpyridazine,
3,6-bis-methylsulphonyl-4-methylpyridazine,
2,5,6-tris-methylsulphonylpyrazine,
2,4-bis-methylsulphonyl-1,3,5-triazine,
2,4-bis-methylsulphonyl-6-(3'-sulphophenylamino)-1,3,5-triazine,
2,4-bis-methylsulphonyl-6-N-methylanilino-1,3,5-triazine,
2,4-bis-methylsulphonyl-6-phenoxy-1,3,5-triazine,
2,4-bis-methylsulphonyl-6-trichlorethoxy-1,3,5-triazine,
2,4,6-tris-phenylsulphonyl-1,3,5-triazine,
2,4-bis-methylsulphonylquinazoline,
2,4-bis-trichlormethylsulphonylquinoline,
2,4-bis-carboxymethylsulphonylquinoline,
2,6-bis-(methylsulphonyl)-pyridine-4-carboxylic acid chloride and
1-(4'-chlorcarbonylphenyl- or 2'-chlorcarbonylethyl)-4,5-bis-methylsulphonyl-pyridazone-(6);

further heterocyclic reactive components with labile halogen are, among others 2- or 3-monochlorquinoxaline-6-carboxylic acid chloride or -6-sulphonic acid chloride,
2- or 3-monobromoquinoxaline-6-carboxylic acid bromide or -6-sulphonic acid bromide,
2,3-dichlorquinoxaline-6-carboxylic acid chloride or -6-sulphonic acid chloride,
2,3-dibromoquinoxaline-6-carboxylic acid bromide or -6-sulphonic acid bromide,
1,4-dichlorphthalazine-6-carboxylic acid chloride or -6-sulphonic acid chloride as well as the corresponding bromine compounds, 2,4-dichloroquinazoline-6- or -7-carboxylic acid chloride or -sulphonic acid chloride as well as the corresponding bromine compounds, 2- r 3- or 4-(4',5' - dichlorpyridazone-6'-yl-1')-phenylsulphonic acid chloride or -carboxylic acid chloride as well as the corresponding bromine compounds, β-(4',5'-dichlorpyridazine-6'-yl-1')-ethylcarboxylic acid chloride, 2-chlorquinoxaline-3-carboxylic acid chloride and the corresponding bromine compound, further 2-chlorbenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride as well as the corresponding derivatives containing sulphonic acid groups in the condensed-on benzene ring, 2-chlorbenzoxazole-5- or -6-carboxylic acid chloride or -sulphonic acid chloride as well as the corresponding bromine derivatives, 2-chlorbenzimidazole-5- or -6-carboxylic acid chloride or -sulphonic acid chloride as well as the corresponding bromine derivatives, 2-chlor-1-methylbenzimidazole-5- or -6-carboxylic acid chloride or -sulphonic acid chloride as well as the corresponding bromine derivatives, 2-chlor-4-methylthiazole-(1,3)-5-carboxylic acid chloride or -4- or -5-sulphonic acid chloride, 2-chlorthiazole-4- or -5-sulphonic acid chloride and the corresponding bromine derivatives.

In conformity with the statements about the prefererd class of dyestuffs obtainable according to the invention, among the aforementioned reactive components there are to be used with particular advantage those which contain 6-membered diazine or triazine rings which have at least one reactive sulphonyl substituent or in which, when they are condensed with the amino-group-containing dyestuff, at least one reactive sulphonyl substituent remains in the reactive component A. Among these reactive components, again those of the pyrimidine series with one or more reactive sulphonyl substituents are of quite special technological interest, since the dyestuffs obtainable therewith exhibit exceptionally good applicability properties.

The new dyestuffs are valuable reactive dyestuffs which are eminently suitable for the dyeing and printing of cellulose-containing materials, in particular of natural and regenerated cellulose, the dyestuffs being applied in the presence of acid-binding agents and possibly with the use of elevated temperature. Dyeings and prints with outstanding fastness properties, in particular very good fastnesses to wetting and light, are achieved.

The dyestuffs are, moreover, suitable for the dyeing and printing of materials which contain NH groups, in particular of wool, silk and synthetic superpolyamide fibres. Here, dyeing is effected in weakly acid bath and, towards the end of dyeing, the pH-value of the dyebath is increased to, for example, pH 6 to 8.

EXAMPLE 0.1 mole of the condensation product of 19 parts by weight 1,3-diaminobenzene-4-sulphonic acid and 24 parts by weight 2-methylsulphonyl-4,5-dichloro-6-methylpyrimidine (obtained according to the particulars given in Example 356 of Belgian patent specification 673,572) is dissolved in 700 parts by volume of cold water, acidified with 28 parts by volume of hydrochloric acid, and diazotised by adding 25 parts by volume of 30% sodium nitrite solution. The thus obtained suspension of the diazonium compound is added to a freshly prepared suspension of 0.1 mole 1-amino-8-hydroxynaphthalene-3,6-disulphonic acid in 800 parts by volume of water and 20 parts by volume of concentrated hydrochloric acid. After the suspensions have been well mixed, 150 parts by volume of a 20% sodium acetate solution are added within 15 minutes. The reaction mixture is stirred for about 4 hours at a pH-value of 2 to 3.

After the end of coupling, there is added to the solution of the monoazo compound thus obtained a suspension (obtained in the usual manner) of the diazonium compound from 0.1 mole 1-aminobenzene-2-sulphonic acid. A further 200 parts by volume of a 20% sodium acetate solution are then added and the reaction mixture is stirred for about 12 hours. After the end of the second coupling, the dyestuff is separated with 500 parts by weight sodium chloride and 350 parts by weight potassium chloride, isolated, and dried at 60° C. in a vacuum. There is obtained the disazo dyestuff of the formula

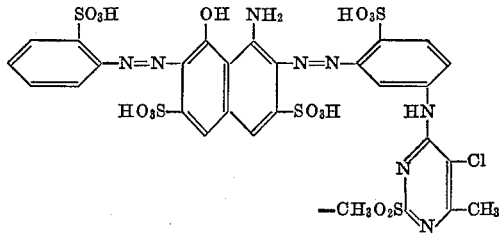

When dried, it is a dark powder which dissolves in water to give a blue-grey colour and, according to the usual techniques of reactive printing or of reactive dyeing, dyes cotton in blue-grey shades.

When, in this example, there is used instead of 1-aminobenzene-2-sulphonic acid an equivalent amount of 1-aminobenzene-2,5-disulphonic acid, there is obtained with analogous method the dyestuff of the formula

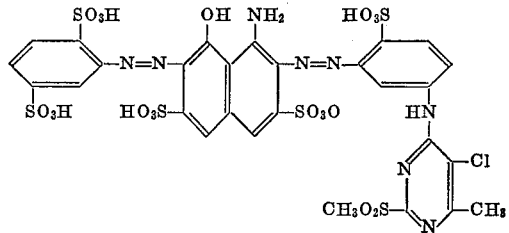

which, when dried, is a dark powder, which dissolves in water to give a blue-grey colour and gives on cotton, in the presence of acid-binding agents, blue-grey prints or dyeings.

Mixtures of 80 parts by weight of one of the two dyestuffs mentioned with 20 parts by weight of orange-coloured reactive dyestuffs such as can be obtained for example according to the particulars given in Example 431 of Belgian patent specification 673,572 give, according to the dyeing and printing instructions usual for reactive dyestuffs, dark, black shades of outstanding fastnesses to wetting.

When, in the method of this example, there are used, instead of 2-methylsulphonyl-4,5-dichlor-6-methylpyrimidine, in each case equivalent amounts of the reactive components stated in the following table, there are likewise obtained valuable reactive dyestuffs which, according to the known techniques of reactive dyeing, dye cotton fast in blue-grey shades:

2,4,6-trichlortriazine-1,3,5
2,4-dichlor-6-aminotriazine-1,3,5
2,4-dichlor-6-methylaminotriazine-1,3,5
2,4-dichlor-6-hydroxyethylaminotriazine-1,3,5
2,4-dichlor-phenylaminotriazine-1,3,5
2,4-dichlor-o- or -m- or -p-sulphophenylaminotriazine-1,3,5
2,4-dichlor-6-N-methyl-N-phenylaminotriazine-1,3,5
2,4,5,6-tetrachlorpyrimidine-1,3
2,4,6-trichlorpyrimidine-1,3
2,4-dichlorpyrimidine-5-carboxylic acid chloride
2-methylsulphonyl-4-chlorpyrimidine-5-carboxylic acid chloride
2-chlorbenzthiazole-5- or -6-carboxylic acid chloride
2-chlorbenzthiazole-5- or -6-sulphonic acid chloride
2-methylsulphonyl- or 2-ethylsulphonyl-benzthiazole-5- or -6-carboxylic acid chloride or -sulphonic acid chloride
1,4-dichlorphthalazine-6-carboxylic acid chloride
2,3-dichlorquinoxaline-6-carboxylic acid chloride
3,5-bis-methylsulphonyl-isothiazole-4-carboxylic acid chloride
2,4-bis-methylsulphonylquinazoline
2-methylsulphonyl-4-chlorquinazoline
2,4-bis-methylsulphonyl-6-chlorpyrimidine
2-methylsulphonyl-4-chlor-5-cyano-6-methoxypyrimidine
2-methylsulphonyl-4-chlor-6-carbomethoxypyrimidine
2-methylsulphonyl-4-chlorpyrimidine-6-carboxylic acid
2,4,6-trifluoropyrimidine
2-methylsulphonyl-4,6-dichlorpyrimidine
2-carboxymethylsulphonyl-4-chlor-6-methylpyrimidine
2-trichlormethylsulphonyl-4-chlor-6-methylpyrimidine
2,4,6-trifluoro-5-chloro-pyrimidine
2,4-difluoro-5-chloro-6-methylpyrimidine
4,6-difluoro-5-chloro-pyrimidine

What is claimed is:
1. A dyestuff of the formula

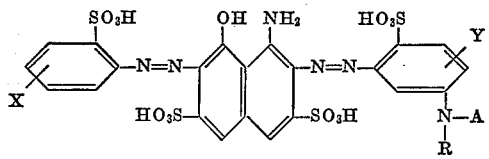

wherein X is hydrogen, sulfonic acid, chlorine, bromine, nitro, lower alkyl or lower alkoxy;
Y is hydrogen or methyl;
R is hydrogen or lower alkyl;
A is a reactive group selected from the group consisting of pyrimidinyl, pyrimidine carbonyl, pyrimidine sulfonyl, quinoxaline carbonyl, quinoxaline sulfonyl, phthalazine carbonyl, phthalazine sulfonyl, quinazoline carbonyl, quinazoline sulfonyl, pyridazonylphenylsulfonyl, pyridazonylethylcarbonyl, benzothiazole carbonyl, benzothiazole sulfonyl, benzoxazole carbonyl, benzoxazole sulfonyl, benzimidazole carbonyl, benzimidazole sulfonyl, pyridazinylphenylcarbonyl, thiazole carbonyl, thiazole sulfonyl and isothiazole carbonyl wherein said reactive group contains a reactive substituent attached to a carbon atom of the heterocyclic ring selected from the group consisting of fluoro, lower alkylsulfonyl, ammonium, phenylsulfonyl, carboxy-phenylsulfonyl, sulfophenylsulfonyl, carboxymethylsulfonyl, trichloromethylsulfonyl and sulfoethylsulfonyl, or a reactive group selected from the group consisting of quinoxaline carbonyl, quinoxaline sulfonyl, phthalazine carbonyl, phthalazine sulfonyl, quinazoline carbonyl, quinazoline sulfonyl, benzothiazole carbonyl, benzothiazole sulfonyl, benzoxazole carbonyl, benzoxazole sulfonyl, benzimidazole carbonyl, benzimidazole sulfonyl, pyridazonylphenylsulfonyl, pyridazonylphenylcarbonyl, pyridazonylethylcarbonyl, thiazole carbonyl, thiazole sulfonyl wherein said reactive group contains a reactive chloro attached to a carbon atom of the heterocyclic ring;

A is bound to N-atom in the

group either directly or via a bridge member selected from the group consisting of -(ethylene)$_p$SO$_2$—, (phenylene)$_p$SO$_2$—, (ethylene)$_p$CO and (phenylene)$_p$CO; and $p$ is 0 or 1.

2. A dyestuff of the formula

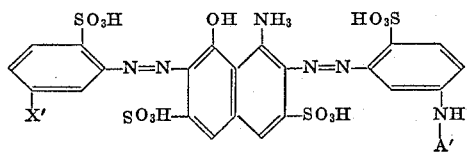

wherein X' is hydrogen or sulfonic acid;
A' is

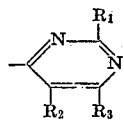

R$_1$ is lower alkyl sulfonyl, phenylsulfonyl or fluorine;
R$_2$ is hydrogen, chlorine, bromine, carboxy, methyl, carbomethoxy, lower alkyl sulfonyl or cyano; and
R$_3$ is methyl, lower alkyl sulfonyl, phenyl sulfonyl, carboxy, carbomethoxy, methoxy or fluorine.

3. The dyestuff of claim 2 wherein A is a reactive residue derived from a member selected from the group consisting of:

2-methylsulfonyl-4-chloropyrimidine-5-carboxylic acid chloride,
2-chlorobenzthiazole-5- or -6-carboxylic acid chloride,
2-chlorobenzthiazole-5- or -6-sulfonic acid chloride,
2-methylsulfonyl- or 2-ethylsulfonyl-benzthiazole-5- or -6-carboxylic acid chloride or -sulfonic acid chloride,
1,4-dichlorophthalazine-6-carboxylic acid chloride,
2,3-dichloroquinoxaline-6-carboxylic acid chloride,
3,5-bis-methylsulfonyl-isothiazole-4-carboxylic acid chloride,
2,4-bis-methylsulfonylquinazoline,
2-methylsulfonyl-4-chloroquinazoline,
2,4-bis-methylsulfonyl-6-chloropyrimidine,
2-methylsulfonyl-4-chloro-5-cyano-6-methoxypyrimidine,
2-methylsulfonyl-4-chloro-6-carbomethoxypyrimidine,
2-methylsulfonyl-4-chloropyrimidine-6-carboxylic acid,
2,4,6-trifluoropyrimidine,
2-methylsulfonyl-4,6-dichloropyrimidine,
2-carboxymethylsulfonyl-4-chloro-6-methylpyrimidine,
2-trichloromethylsulfonyl-4-chloro-6-methylpyrimidine,
2,4,6-trifluoro-5-chloro-pyrimidine,
2,4-difluoro-5-chloro-6-methyl-pyrimidine, and
4,6-difluoro-5-chloro-pyrimidine.

4. The dyestuff of claim 1 of the formula

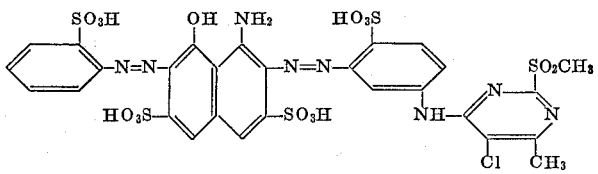

5. The dyestuff of claim 1 of the formula

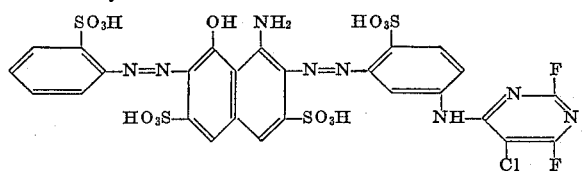

6. The dyestuff of claim 1 of the formula

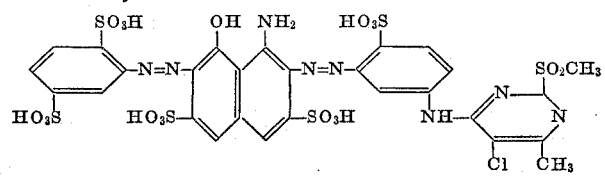

7. The dyestuff of claim 1 of the formula

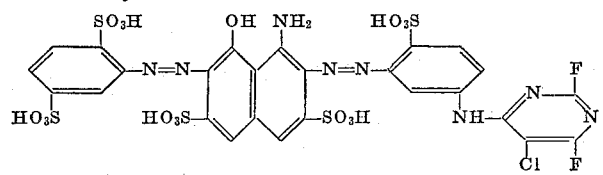

References Cited

UNITED STATES PATENTS

| | | | |
|---|---|---|---|
| 2,860,128 | 11/1958 | Gunst | 260—153 |
| 2,945,022 | 7/1960 | Fasciati et al. | 260—153 |
| 3,072,454 | 1/1963 | Long et al. | 260—153 X |
| 3,109,841 | 11/1963 | Gumprecht et al. | 260—153 |
| 3,134,760 | 5/1964 | Schweizer et al. | 260—146 |
| 3,170,911 | 2/1965 | Benz et al. | 260—153 |
| 3,190,872 | 6/1965 | Oesterlein et al. | 260—153 |
| 3,342,798 | 9/1967 | Dussy et al. | 260—146 |
| 3,377,335 | 4/1968 | Durig et al. | 260—154 X |

FLOYD D. HIGEL, Primary Examiner

U.S. Cl. X.R.

260—146 D, 146 T, 153, 155, 157, 158

UNITED STATES PATENT OFFICE
CERTIFICATE OF CORRECTION

Patent No. 3,711,460   Dated January 16, 1973

Inventor(s) Karl-Heinz Schundehutte

It is certified that error appears in the above-identified patent and that said Letters Patent are hereby corrected as shown below:

| COLUMN | LINE | ERROR |
|---|---|---|
| 1 | 49 | "-ararylene)" should read --- -arylene)--- |
| 2 | 54 | "dichloropyri-midine" should read ---dichlorpyri-midine--- |
| 2 | 58 | "dichloropyri-midine" should read ---dichlor-pyrimidine--- |
| 4 | 20 | " '2-chloro-" should read ---2-chlor--- |
| 6 | 69 | "-dichloro-" should read ---dichlor--- |
| 7 | 10 | "-dichloro-pyrimidine" should read ---dichlor-pyrimidine--- |
| 7 | 11 | "-trichloro-pyrimidine" should read ---trichlor-pyrimidine--- |
| 7 | 18 | "-chloro-pyrimidine" should read ---chlor-pyrimidine--- |
| 8 | 32 | "r" should read ---or--- |
| 9 | 15 | "-dichloro-6-" should read ---dichlor-6--- |

UNITED STATES PATENT OFFICE
CERTIFICATE OF CORRECTION

Patent No. 3,711,460    Dated January 16, 1973

Inventor(s) Karl-Heinz Schundehutte    Page - 2

It is certified that error appears in the above-identified patent and that said Letters Patent are hereby corrected as shown below:

| COLUMN | LINE | ERROR |
|--------|------|-------|
| 9 | 63 in the formula | 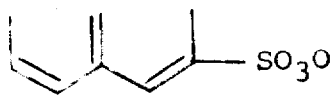 should read 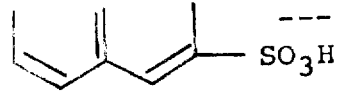 |
| 11 | Claim 2 in the first formula |  should read  |
| 11 | Claim 2 in the first formula | 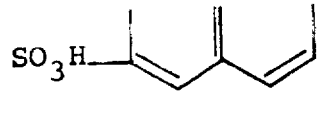 should read 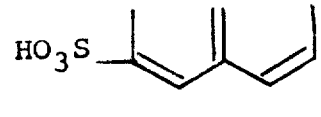 |

Signed and sealed this 24th day of December 1974.

(SEAL)
Attest:

McCOY M. GIBSON JR.
Attesting Officer

C. MARSHALL DANN
Commissioner of Patents